United States Patent
Burckart et al.

(10) Patent No.: US 9,367,635 B2
(45) Date of Patent: Jun. 14, 2016

(54) CONTACT CENTER CO-BROWSING FOR A MOBILE DEVICE

(75) Inventors: Erik J. Burckart, Raleigh, NC (US); Andrew J. Ivory, Wake Forest, NC (US); Todd E. Kaplinger, Raleigh, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 13/026,233

(22) Filed: Feb. 12, 2011

(65) Prior Publication Data

US 2012/0210242 A1   Aug. 16, 2012

(51) Int. Cl.
G06F 3/00   (2006.01)
G06F 9/00   (2006.01)
G06F 17/00   (2006.01)
G06F 17/30   (2006.01)

(52) U.S. Cl.
CPC ............................... G06F 17/30873 (2013.01)

(58) Field of Classification Search
CPC ....... G06F 9/4443; G06F 8/34; G06F 3/0481; G06F 3/0482; G06F 8/38; G06F 3/04847; G06F 3/048; G06F 3/048471; G06F 17/30873; H04N 1/00389; H04N 1/00411
USPC ......... 715/744, 762, 763, 764, 765, 864, 865, 715/866
See application file for complete search history.

(56) References Cited

U.S. PATENT DOCUMENTS

| | | | |
|---|---|---|---|
| 6,230,171 B1 * | 5/2001 | Pacifici et al. | 715/201 |
| 6,871,213 B1 | 3/2005 | Graham et al. | |
| 7,003,550 B1 | 2/2006 | Cleasby et al. | |
| 7,149,776 B1 | 12/2006 | Roy et al. | |
| 7,330,873 B2 | 2/2008 | Yoshida et al. | |
| 7,941,755 B2 * | 5/2011 | Siegrist et al. | 715/760 |
| 8,010,901 B1 * | 8/2011 | Rogers | 715/751 |
| 8,015,496 B1 * | 9/2011 | Rogers | 715/751 |
| 8,239,773 B1 * | 8/2012 | Billman | 715/751 |
| 2002/0035603 A1 | 3/2002 | Lee et al. | |
| 2002/0138624 A1 | 9/2002 | Esenther | |

(Continued)

FOREIGN PATENT DOCUMENTS

| | | |
|---|---|---|
| CN | 1717672 A | 1/2006 |
| CN | 1774707 A | 5/2006 |

(Continued)

OTHER PUBLICATIONS

"Notification of Transmittal of the International Search Report and the Written Opinion of the International Searching Authority, or the Declaration" for PCT/CA2012/050071, mailed Jun. 6 2012, 9 pages, Canadian Intellectual Property Office.

*Primary Examiner* — Tadeese Hailu
*Assistant Examiner* — Anita D Chaudhuri
(74) *Attorney, Agent, or Firm* — Jordan IP Law, LLC

(57) ABSTRACT

Methods and systems of co-browsing may provide for determining a custom set of display parameters for a co-browsing session based on a first set of display parameters corresponding to a first type of browser and a second set of display parameters corresponding to a second type of browser. One or more web applications can be notified of the custom set of display parameters, wherein the web applications may override responses to web requests during the co-browsing session based on the custom set of display parameteters.

27 Claims, 3 Drawing Sheets

(56) References Cited

U.S. PATENT DOCUMENTS

| | | |
|---|---|---|
| 2003/0105819 A1* | 6/2003 | Kim et al. ............... 709/205 |
| 2003/0121983 A1 | 7/2003 | Van Handel |
| 2005/0021626 A1* | 1/2005 | Prajapat et al. ............ 709/205 |
| 2005/0246422 A1* | 11/2005 | Laning ................... 709/205 |
| 2008/0113659 A1 | 5/2008 | Venkateswaran et al. |
| 2009/0164581 A1* | 6/2009 | Bove ............ G06F 17/30873 709/205 |
| 2009/0249216 A1 | 10/2009 | Charka et al. |
| 2009/0271713 A1* | 10/2009 | Stull et al. ................ 715/753 |
| 2010/0037153 A1* | 2/2010 | Rogers ................... 715/758 |
| 2010/0250755 A1* | 9/2010 | Morris ................... 709/228 |
| 2010/0250756 A1* | 9/2010 | Morris ................... 709/228 |
| 2011/0119352 A1* | 5/2011 | Perov et al. .............. 709/218 |

FOREIGN PATENT DOCUMENTS

| | | |
|---|---|---|
| CN | 1866248 A | 11/2006 |
| CN | 201322930 Y | 10/2009 |
| EP | 1132847 A2 | 9/2001 |
| EP | 1327185 B1 | 12/2007 |
| JP | 2001243165 A | 9/2001 |
| JP | 2003006158 A | 1/2003 |
| JP | 2004110567 A | 4/2004 |
| JP | 2006279715 A | 10/2006 |
| JP | 2007257647 A | 10/2007 |
| WO | 0213176 A2 | 2/2002 |
| WO | 03096669 A2 | 11/2009 |

* cited by examiner

FIG. 3
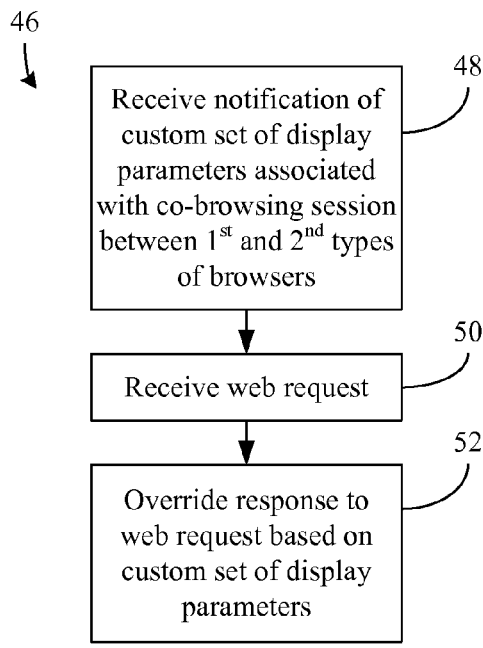
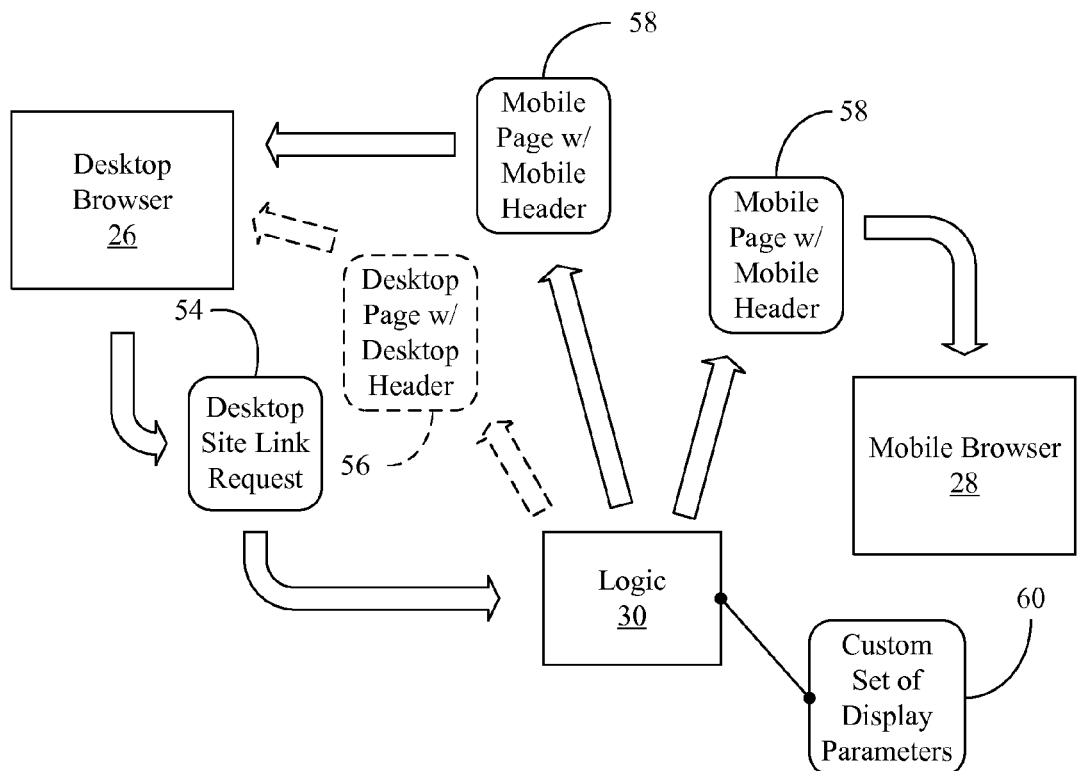
FIG. 4A

CONTACT CENTER CO-BROWSING FOR A MOBILE DEVICE

BACKGROUND

1. Technical Field

Embodiments of the present invention generally relate to co-browsing sessions. More particularly, embodiments relate to co-browsing sessions between mobile and desktop devices.

2. Discussion

Web widgets may support peer-to-peer co-browsing sessions in which two users share viewed pages and may even share highlighted portions of the pages. There may be some scenarios, however, in which the participants of a co-browsing session use devices that have different display capabilities. For example, a handheld device user could participate in a co-browsing session with a contact center (e.g., help desk) participant who is operating a desktop computer. In such a case, certain pages or page content that is viewable on one device may not be viewable on the other device.

BRIEF SUMMARY

Embodiments may involve a computer implemented method in which a custom set of display parameters is determined for a co-browsing session based on a first set of display parameters corresponding to a first type of browser and a second set of display parameters corresponding to a second type of browser. The method can also provide for notifying one or more web applications of the custom set of display parameters. The web applications may be hosted on different servers.

Embodiments may also include a computer program product having a computer readable storage medium and computer usable code stored on the computer readable storage medium. If executed by a processor, the computer usable code can cause a computer to determine a custom set of display parameters for a co-browsing session based on a first set of display parameters corresponding to a first type of browser and a second set of display parameters corresponding to a second type of browser. The computer usable code may also cause a computer to notify one or more web applications of the custom set of display parameters. The web applications may be hosted on different servers.

Other embodiments may involve a computer implemented method in which a notification of a custom set of display parameters is received, wherein the custom set of display parameters is associated with a co-browsing session between a first type of browser and a second type of browser. The method can provide for receiving a web request from a browser associated with the co-browsing session, and overriding a response to the web request based on the custom set of display parameters.

In addition, embodiments can include a computer program product having a computer readable storage medium and computer usable code stored on the computer readable storage medium. If executed by a processor, the computer usable code may cause a computer to receive a notification of a custom set of display parameters associated with a co-browsing session between a first type of browser and a second type of browser. The computer usable code can also cause a computer to receive a web request from a browser associated with the co-browsing session, and override a response to the web request based on the custom set of display parameters.

Embodiments may also involve a computer implemented method in which a first co-browsing registration message is received, and a first set of display parameters is identified based on the first co-browsing registration message. The first set of display parameters can correspond to a first type of browser including at least one of a desktop, laptop and tablet browser. In addition, a second co-browsing registration message may be received, where the method can provide for identifying a second set of display parameters based on the second co-browsing registration message. The second set of display parameters can correspond to second type of browser including a handheld device browser. A custom set of display parameters may be determined for a co-browsing session based on the first and second sets of display parameters. The method can also involve receiving a web request from a browser associated with the co-browsing session, and overriding a response to the web request based on the custom set of display parameters.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 3 is a flowchart of an example of a method of processing a web request according to an embodiment;

FIGS. 4A and 4B are block diagrams of examples of co-browsing schemes that utilize custom sets of display parameters according to embodiments.

DETAILED DESCRIPTION

Figure 1:
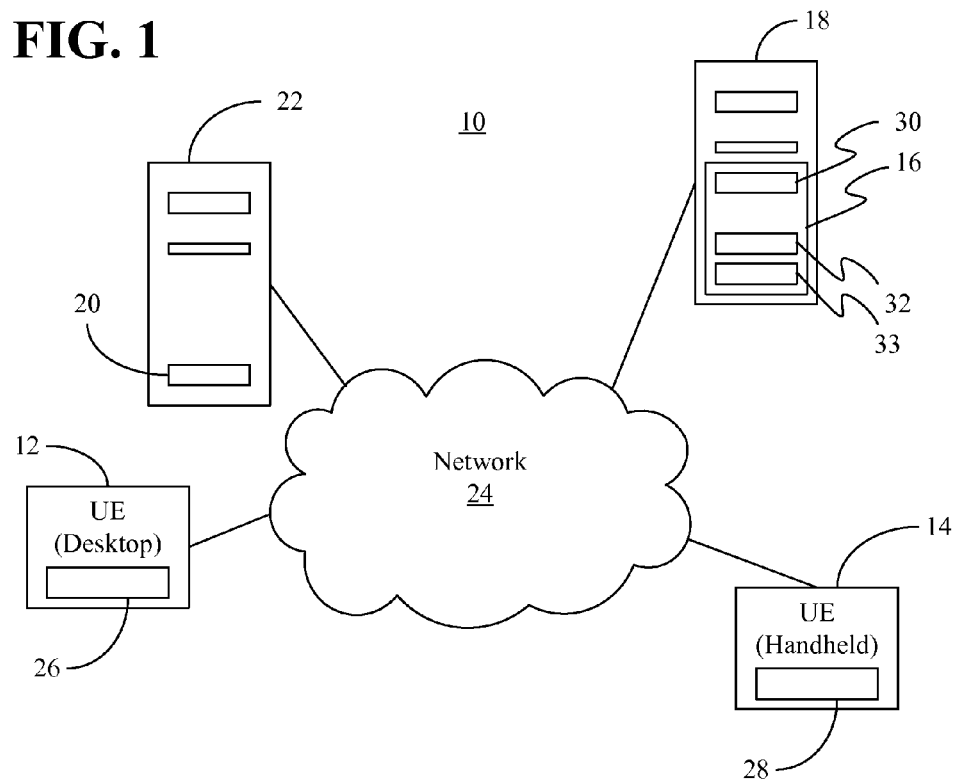
FIG. 1 is a block diagram of an example of a networking architecture according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a networking architecture 10 is shown in which desktop user equipment (UE) 12 device participates in a co-browsing session with handheld UE 14 device over a network 24. For example, the desktop UE 12 device might be a contact center computer operated by personnel (e.g., customer service, help desk, technical support personnel) of an organization and/or enterprise, whereas the handheld UE 14 device could be a device such as a personal digital assistant (PDA) or wireless smartphone operated by an individual in need of assistance and/or guidance from the personnel. Generally, the co-browsing session may involve both UE 12, 14 devices concurrently viewing web content provided by an application such as a web application 16 running on a server 18. During the co-browsing session, the operator of each UE 12, 14 device may navigate to various web pages and select areas of web pages, wherein these actions are displayed to the operator of the other device. The participants of the co-browsing session can also navigate to web pages of other applications hosted other servers (not shown).

Moreover, logic 20 running on a server 22 can register the UE 12, 14 devices for the co-browsing session prior to or during the co-browsing session. In one example, the server 22 might function as a REST ("REpresentative State Transfer") service server that characterizes and constrains the macro-interactions of origin servers, gateways, proxies and clients, without imposing limitations on the individual participants. The web application 16 and logic 20 could alternatively reside on the same server or other platform.

The UE 12, 14 device connections to the network 24 could include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances. The UE 12, 14 devices could be located in the same physical location or in different locations.

In addition, the network 24 can include any suitable combination of servers, access points, routers, base stations, mobile switching centers, public switching telephone network (PSTN) components, etc., to facilitate communication between the UE 12, 14 devices and the servers 18, 22. The servers 18, 22 may include distributed and/or redundant web-based servers that are able to respond to web page requests for content. Thus, the servers 18, 22 can have stored thereon hypertext markup language (HTML) and other markup language-encoded content, as well as databases and applications such as Java and other applications. The servers 18, 22 could also be part of a cloud computing environment in which resources are shared across platforms in a complex fashion.

Generally, the UE 12, 14 devices may each use a different type of browser to access the web content on the server 18. For example, the illustrated desktop UE 12 device includes a browser 26 having a viewing capability that supports devices with relatively large screens such as desktop, laptop and tablet computers. Examples of such browser types may include, but are not limited to, Firefox from Mozilla, Internet Explorer from Microsoft, etc. The illustrated handheld UE 14 device, on the other hand, includes a browser 28 that has limited viewing capability relative to the browser 26 due, at least in part, to the UE 14 device having a smaller screen. Examples of such browser types could include, but are not limited to, Firefox Mobile from Mozilla, Internet Explorer for Mobile from Microsoft, other device-specific proprietary browsers (e.g., Apple iPhone web browser), etc.

As will be discussed in greater detail, the logic 20 may determine a custom set of display parameters for the co-browsing session based on a set of display parameters corresponding to the type of browser 26 running on the desktop UE 12 device and a set of display parameters corresponding to the type of browser 28 running on the handheld UE 14. The custom set of display parameters could constitute a "least common denominator" between the two browser-specific sets of display parameters, or could represent the appropriate web response enhancements needed to enable the co-browsing session between the two different types of browsers 26, 28.

Additionally, the logic 20 may notify the web application 16 of the custom set of display parameters so that link events and click events occurring during the co-browsing session are properly displayed on both UE 12, 14 devices. For example, the illustrated web application 16 includes logic 30 to override standard responses to web requests corresponding to link and click events based on the custom set of display parameters. Thus, the browser 26 running on the desktop UE 12 device might request a page from a full web site 32 (e.g., www.foo.com), wherein the logic 30 instead returns a corresponding page from a mobile web site 33 (e.g., m.foo.com) if the custom set of display parameters indicate that the handheld UE 14 device does not have the capability to view the full site.

In another example, the custom set of display parameters may indicate that one or more special display-related headers (e.g., device type, browser type, browser version, connection type, etc.) should be added to the response to the web request in order for a particular type of browser to view the response properly. Thus, a click event (e.g., item selection from a displayed web page) occurring on the handheld UE 14 device may require the addition of a certain header to the event notification response sent to the desktop UE 12 device in order for the click event to be viewed properly by the desktop browser 26. Similarly, a click event occurring on the desktop UE 12 device could require the addition of a certain header to the event notification response sent to the handheld UE 14 device. The display-related headers may also be used to support the notification of link events and other events to be shared during the co-browsing session.

Figure 2:
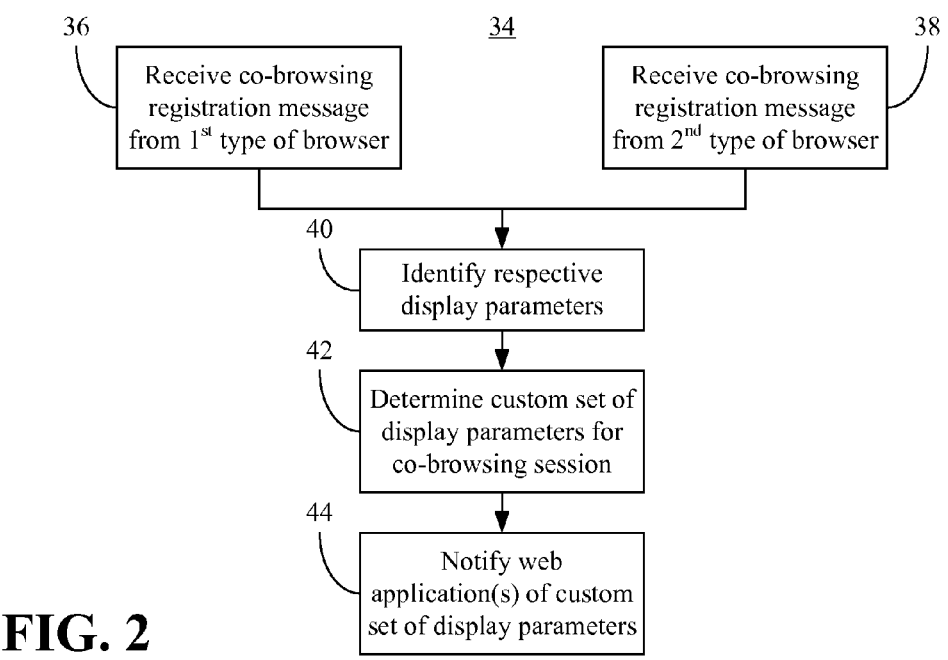
FIG. 2 is a flowchart of an example of a method of establishing a co-browsing session according to an embodiment.

Turning now to FIG. 2, a method 34 of establishing a co-browsing session is shown. The method 34 could be implemented in logic 20 (FIG. 1) of a server such as a REST service platform, or other platform. Illustrated processing block 36 provides for receiving a co-browsing registration message from a first type of browser, and illustrated processing block 38 provides for receiving a co-browsing registration message from a second type of browser. As already noted, the first type of browser might be a desktop, laptop and/or tablet type of browser having both large screen and small screen viewing capability, whereas the second type of browser could be a handheld device type of browser having only small screen viewing capability. In addition, the registration messages may include requests for a link to a co-browsing session launch page, invitations to other devices to join the co-browsing sessions, responses to such requests and/or invitations, and so on.

A first set of display parameters can be identified based on the registration message from the first type of browser and a second set of display parameters can be identified based on the registration message from the second type of browser at block 40. For example, it might be determined that the first type of browser has both large screen and small screen capability and/or that the first type of browser is associated with certain display-related headers (e.g., device type, browser type, browser version, connection type, etc.). Additionally, it could be determined that the second type of browser has only large screen capability and/or that the second type of browser has its own corresponding display-related header information.

Illustrated block 42 provides for determining a custom set of display parameters based on the identified browser-specific sets of display parameters. As already noted, the custom set of display parameters could constitute a "least common denominator" between the two browser-specific sets of display parameters, or could represent the appropriate web response enhancements needed to enable the co-browsing session between the two different types of browsers. One or more web applications may be notified of the custom set of display parameters at block 44. The notified web applications could be hosted on different servers.

FIG. 3 shows a method 46 of processing a web request. The method 46 could be implemented in logic 30 (FIG. 1) of a web application or other suitable application. Illustrated block 48 provides for receiving a notification of a custom set of display parameters associated with a co-browsing session between a first type of browser and a second type of browser. A web request may be received from a browser associated with the co-browsing session at block 50, wherein the web request could correspond to a link event, click event, etc., occurring during the co-browsing session, as already discussed. Illustrated block 52 overrides a response to the web request based on the custom set of display parameters.

For example, if the web request corresponds to a link event that indicates a page from a certain site (e.g., www.foo.com), block 52 might automatically substitute a page from another site (e.g., m.foo.com) for the requested page. Moreover block 52 could add display-related header information to the response. In particular, the additional header information might instruct one of the browsers (e.g., full screen browser) to display the returned page (in the case of a link event) or click animation (in the case of a click event) as if it were displayed in the browser of the other type (e.g., handheld device browser). Similar functionality may be achieved with regard to the handheld device browser, depending upon the viewing capabilities of the handheld device browser. The override may take place entirely on the server side and obviate any need for making modifications to or replacing the browsers participating in the co-browsing session.

Turning now to FIG. 4A, a scenario is shown in which logic 30 receives a web request 54 from a desktop browser 26 during a co-browsing session with a mobile browser 28, wherein the web request 54 identifies a page from the full version of a web site (e.g., www.foo.com). In such a case, the logic 30 can consult a custom set of display parameters 60, which might indicate that both the desktop browser 26 and mobile browser 28 have handheld device viewing capability. Thus, rather than returning a response 56 that contains the requested page from the full version of the web site (and corresponding desktop browser header information), the illustrated logic 30 overrides the response 56 with a response 58 that includes a similar page from the mobile version of the web site (e.g., m.foo.com) and the appropriate display-related header information to instruct the desktop browser 26 to display the returned page as a mobile page.

Figure 4B:
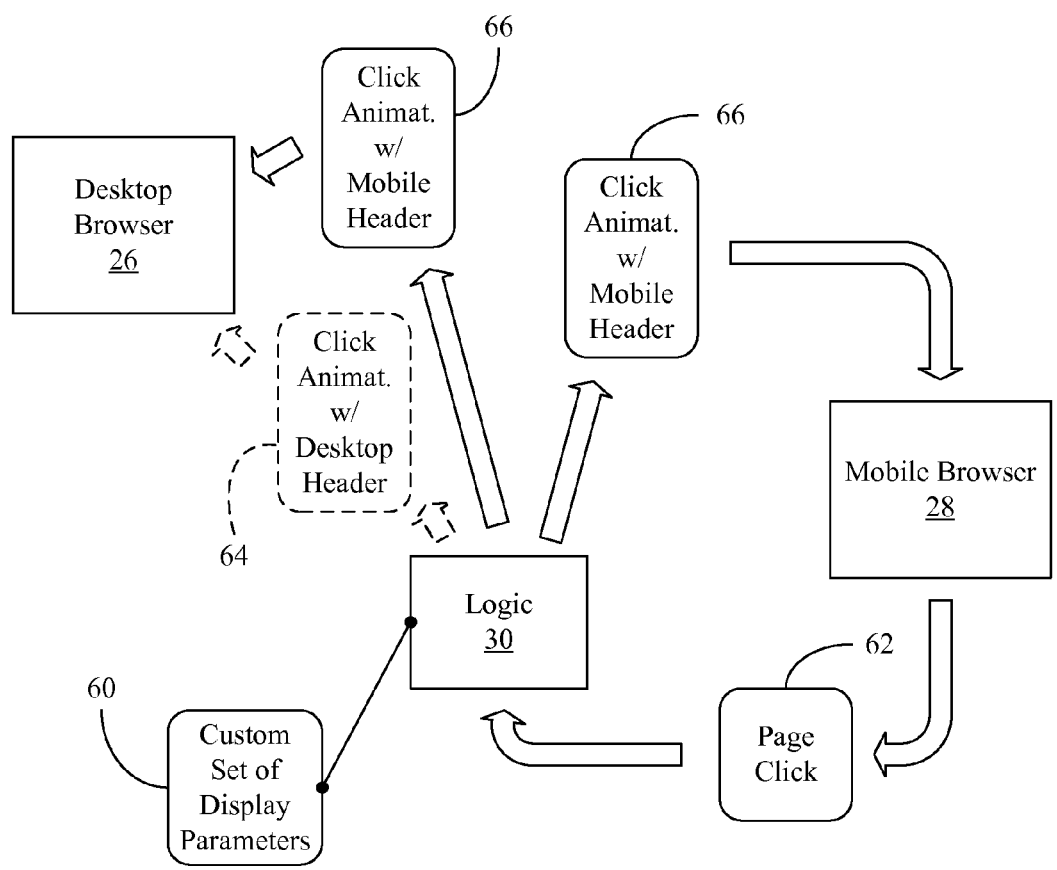

FIG. 4B demonstrates that the logic 30 can also use the custom set of display parameters 60 to process one or more page click events 62 in a co-browsing session. The page click events 62 might be reflected in a document object model (DOM) property used to render pages or other appropriate state characterization. In the illustrated example, the mobile browser 28 issues the click event 62 to the logic 30, which overrides a standard click animation response 64 having desktop header information with a click animation response 66 that includes mobile header information. As noted in the previous example, because the illustrated desktop browser 26 has handheld device viewing capability, the click animation response 66 may have the same look and feel in both the desktop browser 26 and mobile browser 28. Other implementations in which the clients poll for updates from their peers as to link and click events, may also be used.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
    receiving a first co-browsing registration message;
    identifying a first set of display parameters based on the first co-browsing registration message, wherein the first set of display parameters correspond to a first type of browser including at least one of a desktop, laptop and tablet browser;
    receiving a second co-browsing registration message;
    identifying a second set of display parameters based on the second co-browsing registration message, wherein the second set of display parameters correspond to a second type of browser including a handheld device browser;
    determining a custom set of display parameters for a co-browsing session compatible with both the first set of display parameters and the second set of display parameters to render display data on the first type of browser with the same custom set of display parameters as on the second type of browser, wherein the custom set of display parameters include web response enhancements to enable a co-browsing session between the two types of browsers, the first type of browser having a display area greater than the second type of browser, wherein a display of data on the first type of browser has the same appearance as a display of data on the second type of browser;
    notifying one or more server side web applications of the custom set of display parameters;
    receiving a web request from a browser associated with the co-browsing session; and
    overriding a response to the web request based on the custom set of display parameters.

2. The method of claim 1, wherein determining the custom set of display parameters includes identifying a substitute site that is viewable by both the first type of browser and the second type of browser, the web request corresponds to a link event associated with a page from a requested site, and overriding the response to the web request includes substituting a page from the substitute site for the page from the requested site.

3. The method of claim 1, wherein determining the web response enhancements included with the custom set of display parameters includes identifying display-related header information, the web request corresponds to at least one of a link event and a click event of the co-browsing session, and overriding the response to the web request includes adding the display-related header information to the response.

4. A computer implemented method comprising:
    determining a custom set of display parameters for a co-browsing session compatible with both a first set of display parameters corresponding to a first type of browser and a second set of display parameters corresponding to a second type of browser to render display data on the first type of browser with the same custom set of display parameters as on the second type of browser, wherein the custom set of display parameters include web response enhancements to enable a co-browsing session between the two types of browsers, the first type of browser having a display area greater than the second type of browser, wherein a display of data on the first type of browser has the same appearance as a display of data on the second type of browser; and
    notifying one or more server side web applications of the custom set of display parameters.

5. The method of claim 4, wherein determining the custom set of display parameters includes identifying a web site that is viewable by both the first type of browser and the second type of browser.

6. The method of claim 5, wherein the first set of display parameters indicates a handheld device viewing capability and at least one of a desktop, laptop and tablet viewing capability.

7. The method of claim 5, wherein the second set of display parameters indicates a handheld device viewing capability.

8. The method of claim 4, wherein determining the web response enhancements included within the custom set of display parameters includes identifying display-related header information that enables one or more pages associated with the co-browsing session to be viewable by both the first type of browser and the second type of browser.

9. The method of claim 4, further including:
    receiving a first co-browsing registration message;
    identifying the first set of display parameters based on the first co-browsing registration message;
    receiving a second co-browsing registration message; and
    identifying the second set of display parameters based on the second co-browsing registration message.

10. The method of claim 4, wherein the first type of browser includes at least one of a desktop, laptop and tablet browser, and the second type of browser includes a handheld device browser.

11. A computer program product comprising:
a computer readable non-transitory storage medium; and
computer usable code stored on the computer readable non-transitory storage medium, where, if executed by a processor, the computer usable code causes a computer to:
determine a custom set of display parameters for a co-browsing session compatible with both a first set of display parameters corresponding to a first type of browser and a second set of display parameters corresponding to a second type of browser to render display data on the first type of browser using the same custom set of display parameters as on the second type of browser, wherein the custom set of display parameters include web response enhancements to enable a co-browsing session between the two types of browsers, the first type of browser having a display area greater than the second type of browser, wherein a display of data on the first type of browser has the same appearance as a display of data on the second type of browser; and
notify one or more server side web applications of the custom set of display parameters.

12. The computer program product of claim 11, wherein the computer usable code, if executed, causes a computer to identify a web site that is viewable by both the first type of browser and the second type of browser.

13. The computer program product of claim 12, wherein the first set of display parameters is to indicate a handheld device viewing capability and at least one of a desktop, laptop and tablet viewing capability.

14. The computer program product of claim 12, wherein the second set of display parameters is to indicate a handheld device viewing capability.

15. The computer program product of claim 11, wherein the computer usable code, if executed, causes a computer to identify display-related header information based on the web response enhancements included with the custom set of display parameters that enables one or more pages associated with the co-browsing session to be viewable by both the first type of browser and the second type of browser.

16. The computer program product of claim 11, wherein the computer usable code, if executed, causes a computer to:
receive a first co-browsing registration message,
identify the first set of display parameters based on the first co-browsing registration message,
receive a second co-browsing registration message, and
identify the second set of display parameters based on the second co-browsing registration message.

17. The computer program product of claim 11, wherein the first type of browser is to include at least one of a desktop, laptop and tablet browser, and the second type of browser is to include a handheld device browser.

18. A computer implemented method comprising:
receiving a notification on one or more server side web applications of a custom set of display parameters associated with a co-browsing session between a first type of browser and a second type of browser, the custom set of display parameters compatible with both the first type of browser and the second type of browser to render display data on the first type of browser using the same custom set of display parameters as on the second type of browser, wherein the custom set of display parameters include web response enhancements to enable a co-browsing session between the two types of browsers, the first type of browser having a display area greater than the second type of browser, wherein a display of data on the first type of browser has the same appearance as a display of data on the second type of browser;
receiving a web request from a browser associated with the co-browsing session; and
overriding a response to the web request based on the custom set of display parameters.

19. The method of claim 18, wherein the web request corresponds to a link event of the co-browsing session that indicates a page from a first site, and overriding the response to the web request includes substituting a page from a second site for the page from the first site.

20. The method of claim 18, wherein the web request corresponds to at least one of a link event and a click event of the co-browsing session, and overriding the response to the web request includes adding display-related header information to the response based on the web response enhancements included with the custom set of display parameters.

21. The method of claim 18, wherein the first type of browser includes at least one of a desktop, laptop and tablet browser, and the second type of browser includes a handheld device browser.

22. A computer program product comprising:
a computer readable non-transitory storage medium; and
computer usable code stored on the computer readable non-transitory storage medium, where, if executed by a processor, the computer usable code causes a computer to:
receive a notification on one or more server side web applications of a custom set of display parameters associated with a co-browsing session between a first type of browser and a second type of browser, the custom set of display parameters compatible and renderable with both the first type of browser and the second type of browser to render display data on the first type of browser using the same custom set of display parameters as on the second type of browser, wherein the custom set of display parameters include web response enhancements to enable a co-browsing session between the two types of browsers, the first type of browser having a display area greater than the second type of browser, wherein a display of data on the first type of browser has the same appearance as a display of data on the second type of browser;
receive a web request from a browser associated with the co-browsing session; and
override a response to the web request based on the custom set of display parameters.

23. The computer program product of claim 22, wherein the web request is to correspond to a link event of the co-browsing session that indicates a page from a first site, and the computer usable code, if executed, causes a computer to substitute a page from a second site for the page from the first site.

24. The computer program product of claim 22, wherein the web request is to correspond to at least one of a link event and a click event of the co-browsing session, and the computer usable code, if executed, causes a computer to add display-related header information to the response based on the web response enhancements included with the custom set of display parameters.

25. The computer program product of claim 22, wherein the first type of browser is to include at least one of a desktop, laptop and tablet browser, and the second type of browser is to include a handheld device browser.

26. The method of claim 1, wherein the custom set of display parameters provides a least common denominator of display parameters between a first set of browser-specific display parameters and a second set of browser-specific display parameters.

27. The method of claim 1, wherein the second type of browser displays data to provide the same look and feel as data displayed by the first type of browser.

* * * * *